Nov. 14, 1967   P. C. NEILSEN   3,351,997

TOOTHED BLADE FOR TIRE RASP

Filed March 21, 1967

INVENTOR
Peter C. Neilsen
by Zabel Baker York Jones
and Dithmar
Attys

United States Patent Office 3,351,997
Patented Nov. 14, 1967

3,351,997
TOOTHED BLADE FOR TIRE RASP
Peter C. Neilsen, c/o Neilsen Products Co.
Lake Elmo, Minn. 55042
Filed Mar. 21, 1967, Ser. No. 624,758
6 Claims. (Cl. 29—79)

ABSTRACT OF THE DISCLOSURE

A toothed blade for a tire rasp comprising a sheet metal member with a convex arcuate working edge region having equi-spaced cutting teeth. Each tooth has an inner base portion, and a straight leading edge and a straight trailing edge diverging from each other in outward direction. The outer teeth edges are defined by a generally V-shaped recess extending part way to the base portion from the outer ends of the leading and trailing edges. Thus each tooth has two spaced points at its outer end. Some of the teeth are flush with the body of the member; some offset in one direction, and the remainder offset in the opposite direction. The plane surfaces of all teeth are parallel with each other. Two embodiments of the invention are disclosed, differing in the sequence of the flush and directionally offset cutting teeth.

Background of the invention

This invention relates to rasps used in processing a worn vehicle tire for recapping, and more particularly to a replaceable toothed blade for such a rasp.

Blades embodying the invention are improvements over the rasp blades shown in U.S. Patents 2,703,446; 2,896,309 and 3,082,506. These patents are representative of the state of the prior art known to applicant, and each shows a rasp unit of the general type in which subject blades may be used.

The purposes of buffing a worn tire with a rasp preparatory are, mainly, (1) to establish a predetermined uniform contour, and (2) condition the tire surface to establish a secure bond with the recapping material. Blades embodying the invention have been found to establish the desired uniform contour in minimum time without excessive heat, thereby avoiding glazing, and to provide a tire surface capable of establishing a superior bond with the recapping material.

Generally speaking, the blades of the invention buff the tire surface to an unglazed fine texture with an absence of any objectionable undercutting of the material remaining on the surface of the tire. An undercutting condition has been found objectionable for the reason that the cement used in bonding the recapping material tends to fill the undercut voids, leaving air pockets after volatilization of the cement solvent. These air pockets prevent a desired bond, and lead to early separation of the retread material, as does glazing.

Summary

The blade of the invention is formed from a sheet metal member and is characterized by pointed cutting teeth which have plane surfaces lying either flush with the member surfaces or in offset planes parallel to the member surfaces. Teeth having such relationship with the body of the member produce a rapid buff of fine texture with superior bonding qualities.

Description of the preferred embodiments

A toothed blade embodying the invention, as illustrated, comprises a sheet metal member 10 having a thickness of about .029 inch. The material preferably is tempered steel such as customarily used in blades of this type. As a practical example, the radius of the convex line along the extremities of the teeth may be 4½ inches, and the angular length of the blade may be 89 degrees.

Spaced holes 11 and 12 are formed in the blade body for the purpose of mounting the blade in a rasp unit by means of pins extending therethrough.

Member 10 has a convex working edge region 15 in which equi-spaced cutting teeth 16, 17, 18, 19, 20 etc. are formed.

Figure 4:
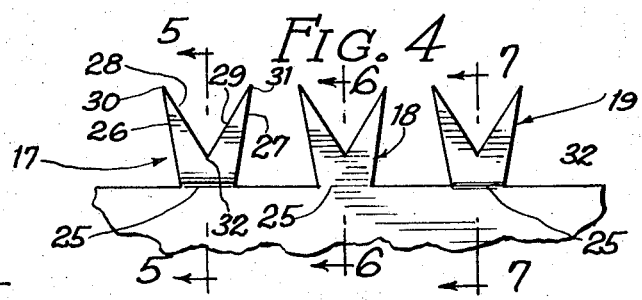
FIG. 4 is a fragmentary enlarged elevational view of three adjacent teeth in the sequence shown in the middle of FIGS. 2 and 3.

Each cutting tooth, as best shown in FIG. 4, has an inner base portion 25 where the tooth joins the body of member 10, straight side edges 26 and 27, one of which is leading and the other trailing, depending on direction of rotation, and a pair of outer tooth edges 28 and 29 defined by a generally V-shaped recess. The tooth thus formed has outer points 30 and 31, the edges 28 and 29 defined by the V-shaped recess intersecting at a point 32 located outwardly of base portion 25.

In the illustrated preferred form, leading and trailing side edges of the tooth diverge uniformly, and the V-shaped recess is symmetrical with respect to these edges. Further, the radial length of a tooth has a ratio of about 3:2 with the depth of the V-shaped recess.

Figure 5:
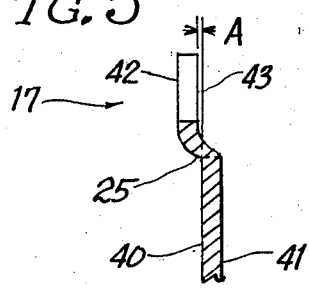
FIG. 5 is a sectional view on line 5—5 of FIG. 4.
Figures 6, 7:
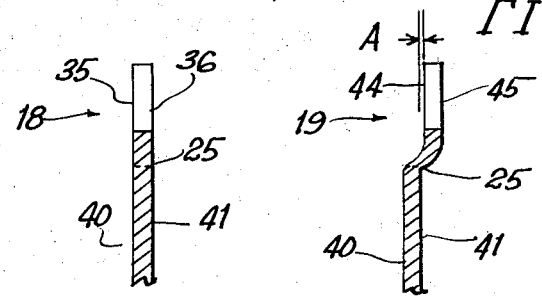
FIG. 6 is a sectional view on line 6—6 of FIG. 4.
FIG. 7 is a sectional view on line 7—7 of FIG. 4.

The three adjacent teeth shown in FIG. 4 have varying relation with the blade body, as shown in FIGS. 5, 6 and 7.

As shown in FIG. 6, tooth 18 has front and rear surfaces 35 and 36 which are flush with corresponding surfaces 40 and 41 of the body of member 10. Tooth 17 (FIG. 5) is offset in one direction from the body of the member by bending at and immediately outwardly of base portion 25, while tooth 19 (FIG. 7) is offset in the opposite direction from the body. As shown, the amount of offset is slightly greater than the blade thickness. By way of example, the dimension designated A in FIGS. 5 and 7 may be .004 inch.

The front and rear surfaces 42 and 43 of offset tooth 17 (FIG. 5) and the front and rear surfaces 44 and 45 of offset tooth 19 (FIG. 7) are parallel to surfaces 40 and 41 of the body of member 10, except, of course, for the tooth surfaces at the bends which provide the offsets.

Figure 1:
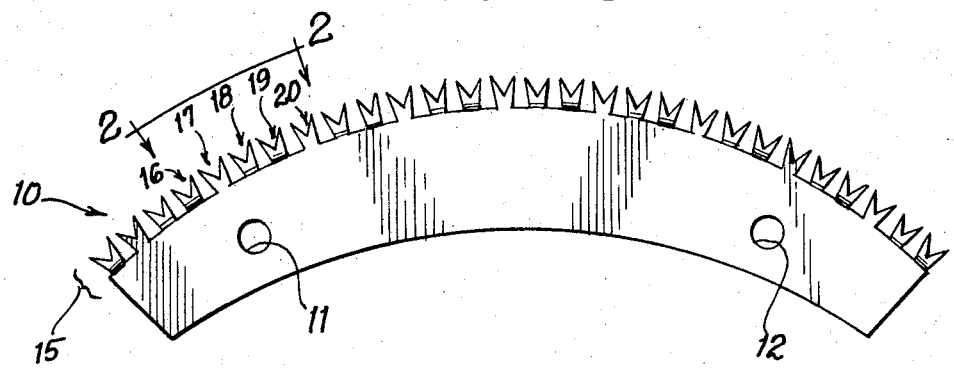
FIG. 1 is a side elevational view of a rasp blade embodying the invention.
Figure 2:
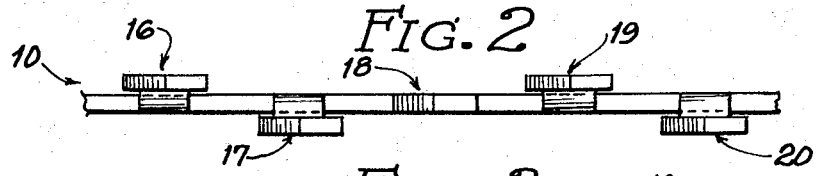
FIG. 2 is an enlarged top view on line 2—2 of FIG. 1 showing one sequence of teeth.

The sequence shown for successive teeth in FIGS. 1 and 2, starting with a flush tooth 18, s flush, offset one direction, offset opposite direction, flush, etc.

Figure 3:
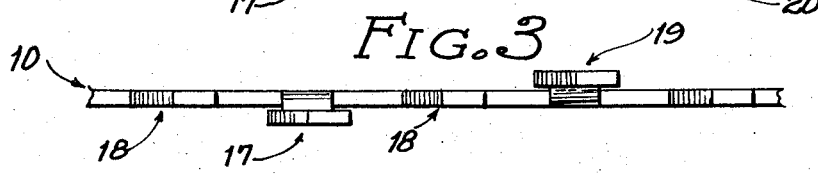
FIG. 3 is a view like FIG. 2 showing another sequence of teeth.

The sequence for successive teeth shown in FIG. 3, starting with a flush tooth 18, is flush, offset one direction, flush, offset opposite direction, flush, etc.

Both teeth sequences have been found to produce a rapid buff of desirably fine and unglazed texture which possesses superior bonding characteristics with subsequently applied retread material.

The blades, including the teeth, are generally symmetrical, and when the leading teeth points and edges have become dulled through use, the blades may be reversed in the associated rasp unit, whereby the previously trailing points and edges become leading points and edges.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

I claim:

1. A toothed blade for a tire rasp comprising a sheet metal member having a convex working edge region with equi-spaced cutting teeth formed in said region, each cutting tooth having an inner base portion, a straight leading edge and a straight trailing edge diverging from each other in outward direction, the outer tooth edges defined by a general V-shaped recess intersecting said leading and trailing edges and forming spaced points at the outer end of the tooth, some of said cutting teeth flush with the body of the member, some offset in one direction and the remainder offset in the opposite direction, the plane surfaces of all said teeth parallel with each other.

2. The combination of claim 1 wherein said leading and trailing tooth edges diverge uniformly and said V-shaped recess is symmetrical with respect to said leading and trailing edges.

3. The combination of claim 1 wherein the outer tooth edges defined by said V-shaped recess intersect outwardly of said base portion.

4. The combination of claim 3 wherein the radial length of a tooth has a ratio of about 3:2 with the depth of said V-shapd recess.

5. The combination of claim 1 wherein successive teeth occur in the following sequence: flush, offset one direction, offset other direction, flush, etc.

6. The combination of claim 1 wherein successive teeth occur in the following sequence: flush, offset one direction, flush, offset other direction, flush, etc.

References Cited

UNITED STATES PATENTS

| | | | |
|---|---|---|---|
| 2,896,309 | 7/1959 | Jensen | 29—79 |
| 2,975,504 | 3/1961 | Bentham | 29—78 |
| 3,082,506 | 3/1963 | Jensen | 29—79 |
| 3,102,325 | 9/1963 | Hemmeter | 29—79 |

HARRISON L. HINSON, *Primary Examiner.*